United States Patent Office 3,700,416
Patented Oct. 24, 1972

3,700,416
EXTRACTION OF VANADIUM AND COPPER WITH FLUORINATED BETA-DIKETONES
Michael F. Lucid, Oklahoma City, Okla., assignor to Kerr-McGee Corporation, Oklahoma City, Okla.
No Drawing. Filed Sept. 4, 1970, Ser. No. 69,950
Int. Cl. B01d *11/04;* C01g *3/00, 31/00*
U.S. Cl. 23—312 R   7 Claims

ABSTRACT OF THE DISCLOSURE

A method for the extraction of metals from aqueous acidic solutions is provided which comprises extracting the metals with a fluorinated β-diketone in an organic solvent, the metal being extracted into the organic phase.

BACKGROUND OF THE INVENTION

The extraction of metals such as vanadium, iron, copper and thorium from acidic solutions has been the subject of much research. Examples of such acidic solutions include acidic copper leach solutions and the raffinate or aqueosu discard resulting from the extraction of uranium from the acid leaching of sandstone ores. In some cases, it is necessary to extract the metals from the acidic solutions in order that the solution may be used in applications where the metal would prove undesirable. Furthermore, in view of the decreasing supply of many metals, increased efforts have been made to recover metals from industrial waste solutions and from low grade ores.

The compound 2-thenoyltrifluoroacetone is known and its use as an extractant for metals has been suggested. However, it has been determined that such compound is not effective in complexing certain metal ions present in acid waste liquors. Its use as an extractant for recovering metals from such liquors has not been completely satisfactory on a commercial basis.

SUMMARY OF THE INVENTION

In accordance with this invention, it has been discovered that metals may be extracted from aqueous acidic solutions through the use of fluorinated β-diketones dissolved in an organic solvent. The diketone forms a complex with the metal, allowing extraction through an organic phase separation.

The metal values are extracted from the acid utilizing the fluorinated β-diketone extractants of the invention into the organic phase, and the loaded organic phase thereafter is separated from the aqueous acidic phase due to the immiscibility of the aqueous and organic phases.

The extractants of the present invention are fluorinated β-diketones of the formula:

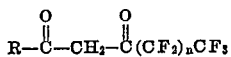

wherein

R is a radical selected from the group consisting of
  (a) aromatic radicals containing from 6 to 14 ring carbon atoms, which may contain conventional substituents such as alkyl, halo, nitro, alkoxy, and amino groups; and
  (b) heterocyclic radicals containing five and six ring members wherein from one to two of the ring members may be selected from the group consisting of oxygen, sulfur and nitrogen, and which may contain conventional substituents such as alkyl, halo, nitro, alkoxy and amino groups and $n$ has a value of 0 to 15.

The fluorinated β-diketones of this invention are characterized by high oxidative stability, resistance to acidic hydrolysis, relatively high intrinsic acidity of the enolic hydrogen and powerful chelating ability.

Examples of R as an aromatic radical include phenyl, naphthyl, diphenyl and anthracyl. Examples of alkyl substituents on said aromatic radical include methyl, ethyl, n-propyl, iso-propyl, n-butyl, iso-butyl, sec-butyl, tert-butyl, n-octyl, and iso-octyl. Alkoxy groups include methoxy, propoxy, butoxy, and octyloxy. The halo substituents are fluoro, chloro, bromo and iodo. According to a preferred embodiment of the present invention, the halo substituent is fluoro.

Examples of R as an heterocyclic radical include derivatives of furan, tetrahydrofuran, isooxazole, oxazole, oxazolidine, thiazole, pyrazole, pyrrole, thiophene, morpholine, oxazine, pyrazine and piperidine.

The preferred heterocyclic groups of the above formula are represented by the formula

wherein X is sulfur, oxygen or nitrogen.

Examples of the perfluoro aliphatic radical

include fluoro substituted straight and branched chain alkyl groups where $n$ is 0 to 15. Examples of such groups include perfluoro derivatives of methyl, ethyl, n-propyl, iso-propyl, n-butyl, iso-butyl, tert-butyl, n-hexyl, n-octyl, iso-octyl, n-decyl, and n-dodecyl.

According to a preferred aspect of the invention, the extractants of the above formula contain a perfluoro-aliphatic group wherein $n$ is a positive integer.

According to a further preferred embodiment of the present invention, $n$ is a positive integer from 1 to 10.

Examples of particular extractants which are suitable for use in the present invention include:

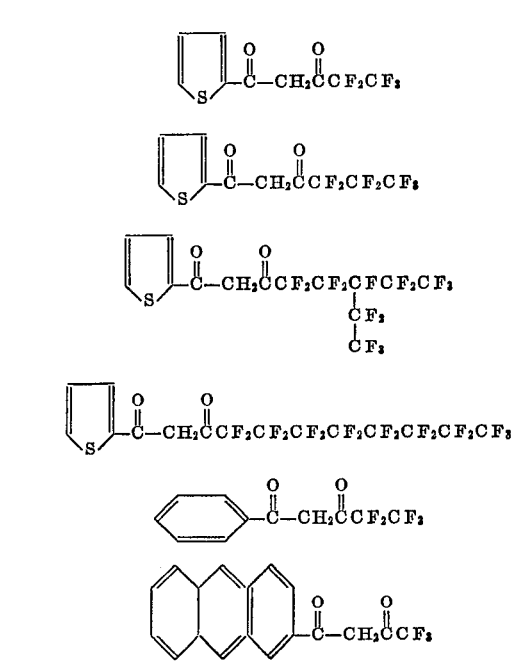

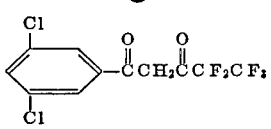

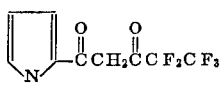

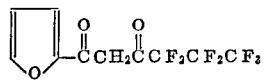

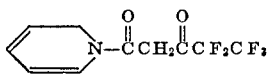

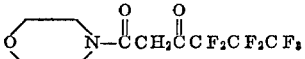

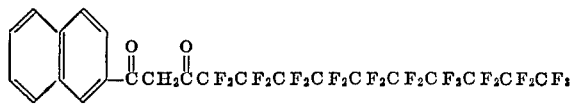

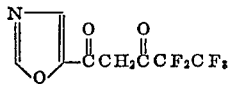

In those instances where $n=0$, it is necessary that the aromatic or heterocyclic ring contain an aliphatic substituent. Examples of such compounds include:

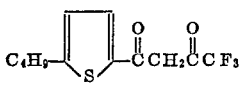

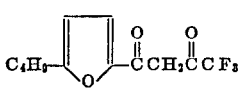

Many of the compounds described above as extractants of this invention are known in the art and described in the literature; those not explicitly described may be prepared by analogous methods. One method of preparation which may be used is the reaction of an aromatic or heterocyclic compound containing an acetyl moiety with a lower alkyl ester of a perfluorinated aliphatic acid via the known Claisen condensation:

wherein R and $n$ are as previously defined. The reaction is generally conducted in the presence of an alkoxide such as sodium methoxide or sodium ethoxide as a catalyst, in the presence of an inert organic solvent. Typical inert organic solvents are diethyl ether and tetrahydrofuran.

Solvents which may be used to effect separation of the metal complex from the acidic phase comprise those materials which are capable of forming a phase which is immiscible with the aqueous phase. Such materials are referred to herein by the term "water-immiscible organic solvent." Such solvent is an organic material, normally liquid at ambient temperatures and substantially, but not necessarily entirely, insoluble in water. Preferred organic solvents for the process of the present invention are hydrocarbons. Examples of suitable hydrocarbon solvents include isooctane, kerosene, "Soltrol 170" (a commercially available naphthenic hydrocarbon solvent), benzene, toluene, xylene, isodecane, fuel oils, mineral oils, hexane, heptane, octane, "Panasols" (commercially available petroleum aromatic solvents), "Napoleum 470" (commercially available petroleum naphtha), and the like. Solvents which contain functional groups can also be employed provided that the functional groups do not adversely affect the extraction. Thus, chlorinated and fluorinated hydrocarbons such as carbon tetrachloride, trichloroethylene and perfluorokerosene can be used.

Generally, the fluorinated β-diketones extractants may be employed in widely varying amounts. Generally, the amount present will be from about 0.1 to 100% by weight based on the total organic phase with an amount of from about 0.2 to 10% by weight being particularly preferred.

The fluorinated β-diketone extractants useful in the process of the present invention are also characterized as having a solubility in the water-immiscible organic solvent sufficiently high to form a 0.01 molar solution in the solvent.

The ratio of organic solvent to the aqueous phase is not critical and will vary with the specific application.

In addition to the above solubility characteristics, the fluorinated β-diketone extractants should have a solubility in the aqueous medium from which the metal ion is to be extracted of less than 50 p.p.m. by weight for successful commercial operations. Thus, the compound 2-thenoyltrifluoroacetone is not suitable as an extractant in most cases when used alone, whereas the preferred thenoyl extractants, i.e., where $n$ is a positive integer or a substituted thiophene when $n=0$, generally possess the desired solubility characteristics.

The foregoing description and the following specific examples are for purposes of illustration, and are not to be considered as limiting the scope of the invention, reference being had to the appended claims for this purpose.

EXAMPLE 1

This example illustrates the recovery of vanadium and iron, the vanadium being in the tetravalent state and the iron being in the trivalent state, from an aqueous acidic solution.

A one stage shakeout was made with a uranium raffinate solution and 0.1M of the extractant of the formula

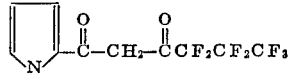

in "Soltrol 170" diluent. The contact time was 15 minutes.

The organic and aqueous phases were separated and the aqueous phase was found to contain 16% of the vanadium originally present and 5% of the iron (in the ferric state). Thus, 84% of the vanadium and 95% of the iron (III) had been extracted from the reaffinate solution.

EXAMPLE 2

This example illustrates the recovery of copper in the cupric state from acidic aqueous solutions. A solution containing 1 gram/liter of copper in sulfuric acid at pH 2 was contacted with a fluorinated β-diketone of the formula

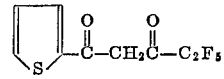

in hexane for five minutes. An examination of the aqueous phase after separation determined that a total of 98.9% of the copper originally present had been extracted.

EXAMPLES 3–8

Following the procedure of Example 2, the following fluorinated β-diketones were substituted for the fluorinated β-diketone of Example 2. The identical procedure of Example 2 was carried out, and the aqueous phase was examined to determine the percentage of copper extracted.

Analysis showed 50% of the copper was extracted into the organic phase.

| Example | Fluorinated β-diketone | Copper extracted, percent |
|---|---|---|
| 3 | ![structure] thiophene-C(O)-CH$_2$-C(O)CF$_2$CF$_2$CF$_3$ | 76.6 |
| 4 | ![structure] thiophene-C(O)-CH$_2$-C(O)-CF$_2$CF$_2$CF$_2$CF$_2$CF$_2$CF$_2$CF$_3$ | 92.9 |
| 5 | pentafluorophenyl-C(O)-CH$_2$-C(O)-CF$_3$ | 52.0 |
| 6 | pentafluorophenyl-C(O)-CH$_2$-C(O)-CF$_2$CF$_3$ | 54.0 |
| 7 | pentafluorophenyl-C(O)-CH$_2$-C(O)-CF$_2$CF$_2$CF$_3$ | 49.0 |
| 8 | pentafluorophenyl-C(O)-CH$_2$-C(O)-CF$_2$CF$_2$CF$_2$CF$_2$CF$_2$CF$_2$CF$_3$ | 38.8 |

EXAMPLE 9

This example illustrates the recovery of thorium from an acidic solution using a fluorinated β-diketone of the present invention.

A solution containing 50 grams/liter of a fluorinated β-diketone of the formula

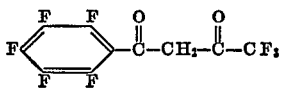

in hexane was contacted for 10 minutes with an equal volume of a thorium nitrate solution containing 1 gram/liter thorium at pH 3.0

After separation of the organic and aqueous phases, an analysis of the aqueous phase demonstrated that all of the thorium was in the organic phase. The analysis was conducted by X-ray fluorescence.

EXAMPLE 10

An organic solution containing

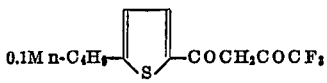

in "Soltrol 170" was contacted with an equal volume of copper (II) sulfate (1 g./l. Cu) solution at pH 2. Analysis showed 95% of the copper was extracted into the organic phase.

EXAMPLE 11

An organic solution containing

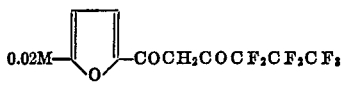

in "Soltrol 170" was contacted with an equal volume of copper (II) sulfate (1 g./l. Cu) solution at pH 1.5.

EXAMPLE 12

Thorium is extracted from an acidic solution containing a mixture of rare earth chlorides by contacting said solution with

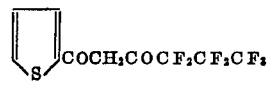

as the extractant at a pH of about 4.0. Substantially all of the thorium is recovered leaving the remaining rare earth metals in the solution.

In each instance, after the metal-containing organic phase is separated from the aqueous phase, the metal is recovered by stripping with a strong mineral acid which may be in admixture with a reducing agent or an oxidizing agent. Alkali can be used as a stripping agent; however, in many instances its use results in decomposition of the extractant whereby it cannot be re-used.

What is claimed is:

1. A process for extracting a metal ion from an aqueous acidic mixture containing said metal ion comprising: contacting said acidic mixture with a water-immiscible organic solvent containing at least one fluorinated β-diketone extractant said extractant having a solubility in the acidic mixture of less than 50 p.p.m. by weight and the formula

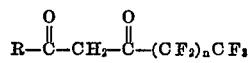

wherein $n$ has a value of 0 to 15 and R is a radical selected from the group consisting of
(a) aromatic radicals containing from 6 to 14 ring carbon atoms and containing only substituents selected only from the group consisting of nitro, fluoro, alkoxy, and amino groups, and (b) heterocyclic radicals containing five and six ring members wherein from one to two of the ring members is selected from the group consisting of oxygen, sulfur and nitrogen and when $n=0$, contains at least one substituent selected from the group consisting of alkyl, halo, nitro, alkoxy and amino groups and when $n$ has a value of 1 to 15 may contain at least one of said substituents.

to form an organic phase containing said metal ion separate from the aqueous phase; and removing said organic phase containing said metal ion from the aqueous phase, said metal ion being selected from the groups consisting of vanadium and copper.

2. A process as set forth in claim 1 in which the metal ion is recovered from the organic phase by stripping with strong mineral acid.

3. A process as set forth in claim 1 in which $n$ is an integer from 1 to 10.

4. A process as set forth in claim 1 in which $n$ is 2.

5. A process as set forth in claim 4 in which R is an aromatic radical.

6. A process as set forth in claim 4 in which R is a heterocyclic radical.

7. A process as set forth in claim 6 in which R is a radical of the formula

wherein X is selected from the group consisting of oxygen, sulfur and nitrogen.

References Cited
FOREIGN PATENTS 895,676   5/1962   Great Britain _____ 23—312 ME

OTHER REFERENCES

Nuclear Science Abstracts, vol. 8, No. 13, July 15, 1954, p. 480, No. 4018.

Nuclear Science Abstracts, vol. 6, No. 14, July 31, 1952, p. 496, No. 4015.

Nuclear Science Abstracts, vol. 16, No. 13, July 15, 1962, p. 2130, No. 16407.

Nuclear Science Abstracts, vol. 20, No. 21, Nov. 15, 1966, p. 4719, No. 38855.

Li: NYO-1922-43, April 1968, pp. 1-10.

Nuclear Science Abstract, vol. 21, No. 20 Oct. 31, 1967, p. 3783, No. 36105.

NORMAN YUDKOFF, Primary Examiner

S. J. EMERY, Assistant Examiner

U.S. Cl. X.R.

23—312 ME; 260—593 H